Feb. 24, 1959 A. WINTHER Re. 24,608

MAGNETIC CLUTCH

Original Filed April 16, 1949 2 Sheets-Sheet 1

Anthony Winther,
Inventor.
Koenig and Pope,
Attorneys.

Anthony Winther,
Inventor.
Koenig and Pope,
Attorneys.

United States Patent Office

Re. 24,608
Reissued Feb. 24, 1959

24,608

MAGNETIC CLUTCH

Anthony Winther, Kenosha, Wis., assignor, by mesne assignments, to Eaton Manufacturing Company, Cleveland, Ohio, a corporation of Ohio Original No. 2,543,394, dated February 27, 1951, Serial No. 87,885, April 16, 1949. Application for reissue August 3, 1953, Serial No. 372,211

10 Claims. (Cl. 192—21.5)

Matter enclosed in heavy brackets [ ] appears in the original patent but forms no part of this reissue specification; matter printed in italics indicates the additions made by reissue.

This invention relates to magnetic clutches of the type in which a flowable magnetic material of magnetically variable shear strength is employed for closing a magnetic gap between magnetic members when a magnetic field is energized, the magnetic material being movable into a position physically to open the gap when the magnetic field is deenergized. The invention is an improvement in certain respects upon constructions such as shown in the following copending United States applications: Martin P. Winther, Serial No. 28,452, filed May 21, 1948, for Dynamoelectric Machine Containing a Magnetic Fluid Mixture, eventuated as Patent 2,525,571; Martin P. Winther and Ralph L. Jaeschke, Serial No. 71,844, filed January 21, 1949, for Dynamoelectric Machine, *eventuated as Patent 2,604,964, dated July 29, 1952;* and Martin P. Winther and myself, Serial No. 83,980, filed March 28, 1949, for Electromagnetic Clutch, *eventuated as Patent 2,601,076, dated June 17, 1952.*

Briefly, the object of the invention is to minimize the movement of the flowable magnetic material required to displace it between its released position opening the gap and its magnetic locking position closing the gap; a further object being to accomplish this improvement with a simple structure involving no moving parts.

Broadly speaking, the objects are accomplished by placing closely spaced recesses or pockets on the inside of a hollow outer rotary cylinder, which pockets provide lands between them effecting magnetic gaps with respect to a solid cylindric surface or surfaces of an inner rotary cylinder. These pockets are adapted when the clutch is deenergized to accept a sufficient amount of centrifugally displaced magnetic material to establish an air gap between the lands and the inner cylinder. When the clutch is energized to provide a magnetic field, the magnetic material is drawn over only short distances for closing said gaps with magnetic material, the latter being stiffened by said magnetic field to act as a coupling between the rotary members. Other objects and accomplishments of the invention will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated.

Figure 1:
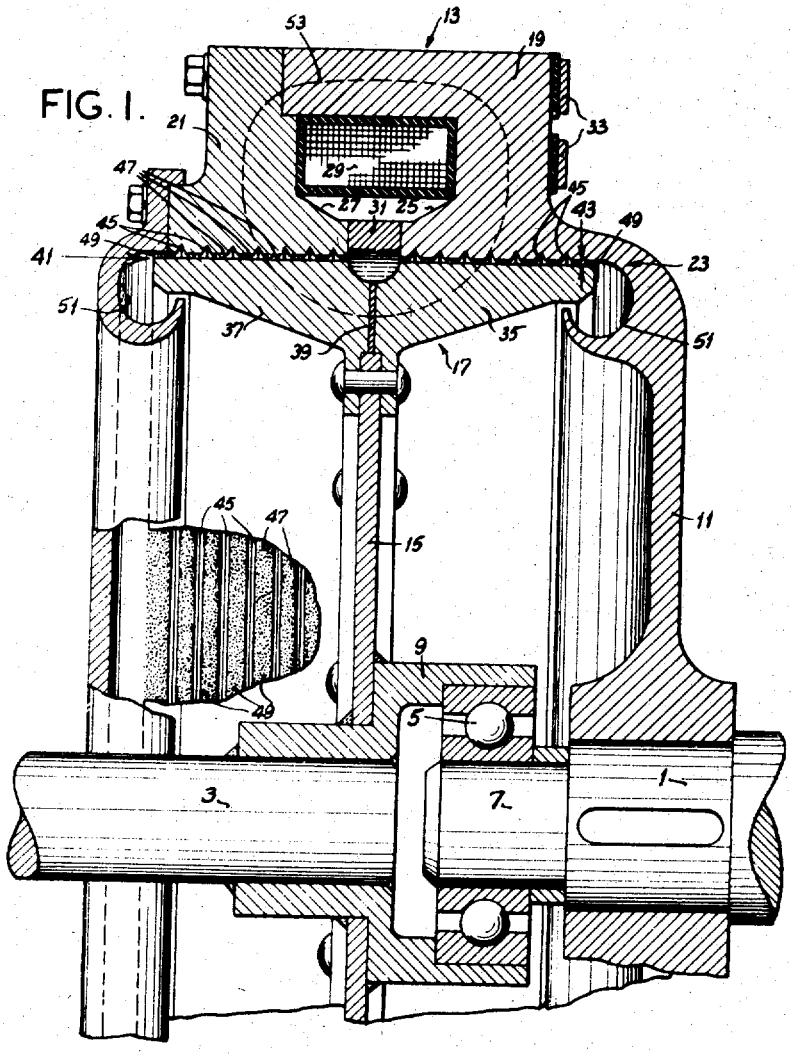
Fig. 1 is a longitudinal half-section through a typical clutch embodying the invention.

Referring now more particularly to Fig. 1, there is shown at numeral 1 what is preferably the drive shaft and at numeral 3 what is preferably the driven shaft. Shafts 1 and 3 are aligned *on a common concentric axis* by means of a pilot bearing 5 carried on a reduced end 7 of shaft 1 and within a hub 9 on shaft 3. Keyed to the shaft 1 is a supporting spider 11 for an annular field member 13. Attached to the hub 9 is a disc 15, to the rim of which is fastened an inductor member 17.

The field member 13 is made up of two magnetic rings 19 and 21 which are interiorly formed as a hollow cylinder 23. The rings are recessed, as shown at 25 and 27, to receive an annular field coil 29. Within the coil 29, the rings 19 and 21 are spaced by means of a nonmagnetic ring 31 composed of, for example, stainless steel, aluminum, brass, or the like. The coil 29 is variably excited from a suitable outside circuit which connects with the coil through suitable collector rings 33. Details of the circuit, including brushes (not shown) upon the collector rings 33, will not be necessary, since such circuits for feeding rotary coils are known.

The inductor member 17 is constituted by two magnetic rings 35 and 37 between which is interposed a thin sheet 39 of nonmagnetic material such as, for example, stainless steel, aluminum, brass, mica or the like. This nonmagnetic ring may be of the order of 1/64 inch thick. The outer surfaces of the rings 35 and 37 are exteriorly formed as cylinders 41 spaced from the hollow cylinder 23 by means of a small spacing or gap 43. This spacing may be about 1/32 inch or less. The surface of the hollow cylinder 23 is provided with spaced peripheral V-shaped grooves 45 which provide annular lands 47 *forming therebetween flux concentrating means which concentrate flux along narrow circumferentially extending zones in the space or air gap 43.* A satisfactory arrangement is one in which the widths of the lands 47 are about twice the widths of the grooves 45, but this relationship is not to be taken as limiting.

A quantity of flowable magnetic material 49 is carried between the cylinders 23 and 41. Labyrinth seals 51 prevent leakage of material from the rotary elements. Various flowable magnetic mixtures may be used. For example, a fairly thin machine oil such as S. A. E. No. 10 or equivalent, mixed with 9 parts by weight of finely divided low-reluctance iron particles such as Carbonyl-E iron of about 8 microns in diameter, or Swedish powdered iron of about 300 mesh, may be used. A silicone oil may be substituted for the machine oil. The resulting mixture has a creamy consistency which under normal circumstances flows sluggishly. Another material has a grease base and is constituted by silicone grease in a ratio by weight of iron particles to grease of 3:1. This material is deformable and flows under pressure but tends to adhere to any surface upon which it is placed. Another suitable material of a dry variety is a mixture of said finely divided iron particles and a quantity of solid dry powdered lubricant such as graphite, mica, soapstone, potstone, steatite, French chalk, lamp black or the like. A ratio of 1:1 by volume of dry Carbonyl-E powdered iron and dry graphite is satisfactory, for example. Further details in respect to the dry mixture may be obtained from the copending United States application of Howard J. Findley, Serial No. 38,543, filed July 13, 1948, for Magnetic Drive, now abandoned, and Patent 2,519,449 of August 22, 1950, of Howard J. Findley.

Figure 3:
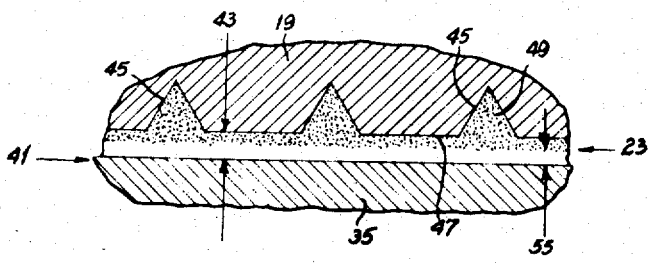
Fig. 3 is a view similar to Fig. 2, showing conditions when the clutch is deenergized [.]; *and,*

The depths of the grooves 45 and the total amount of flowable material are such that under deenergized conditions of the coil 29 and rotation of the field member 13, centrifugal force will result in the flowable material taking up the position shown in Fig. 3, wherein it fills the grooves 45, but an insufficient amount of material is left over to fill the space 43 between the cylinders 23 and 41. The resulting air space is then as shown at 55. The result is that the cylinders may rotate relatively without any frictional drag between them, except an inconsequential amount due to windage.

Figure 2:
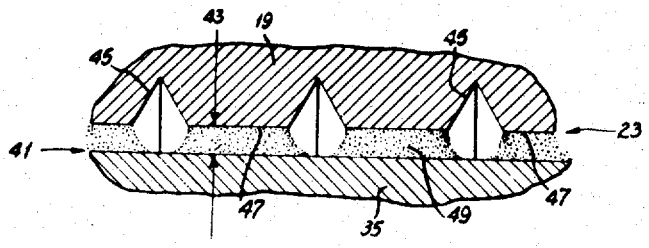
Fig. 2 is an enlarged longitudinal detail section showing conditions in the magnetic gap when the clutch is energized; [and,]

When the coil 29 is excited, a toroidal *electrical* flux field will be generated of the general form shown by the dash lines 53. This interlinks the field member 13 and inductor 17, passing through the space 43 between the cylinders 23 and 41. This inductively magnetizes the *fluid* material 49, *which is flux field responsive,* causing it to move by attraction from the position shown in Fig. 3 to the position shown in Fig. 2. In the latter position, it fills the cylindric spacing between each land 47 of cylinder 23 and the adjacent surface of cylinder 41. *The adjacent surfaces of cylinders 23 and 41 constitute opposite poles of the flux field.* At the same time, the viscosity or shear properties of the flowable material are magnetically increased so that after an initial period of acceleration of the inductor member 17 (assuming field member 13 to be driving), these members come into synchronism wherein the rings 49 of stiffened magnetic material act as driving connections, *causing torque to be transmitted between the relatively movable members 13 and 17.* At this time (Fig. 2) the grooves 45 are substantially empty. The reason for the latter phenomenon is that the magnetic field is less strong where it crosses between the cylinder 49 and the grooves 45 than it is between the cylinder 49 and the lands 47. Thus the material at the lands is more strongly inductively magnetized than in the grooves and is attracted from its position in the grooves 45 to the lands. When the coil 29 is deenergized, the field 53 disappears and the material 49 loses its magnetically stiffened properties and freely flows under centrifugal force from the position shown in Fig. 2 to the position shown in Fig. 3, wherein there is no physical connection between the cylinders 23 and 41. The result is the elimination of all viscous drag between the cylinders 23 and 49 by the material 41 when the clutch is deenergized or released.

An advantage of the invention over the structures heretofore suggested for the purpose is that the material pocketed in the grooves 45 under the conditions of Fig. 3 is closer than heretofore to the surfaces such as 47 which are to be connected with the opposite rotary member. The magnetic fluid when demagnetized is immediately pocketed upon release to provide the clearance 55. The pockets are distributed throughout the magnetic gap in such a way that distributed small masses of magnetic material are available to flow over only short distances into their connecting positions when the clutch is energized. The result is that time lag is reduced both in closing and opening of the clutch in response to control of the coil 29. It will be clear that the invention can be carried out by other forms of distributed pockets such as helical grooves in cylinder 23, or the like. Other forms of pockets may also be used, and it will be understood that the invention is applicable to any form of electric clutch employing a flowable magnetic material, including polarized eddy-current clutches and others.

It is to be understood that any spiral grooves that might be used are, for the purpose of the invention, a species of circular grooves. Moreover, the V-shape is optional, U-shapes, square shapes and the like being acceptable.

Figure 4:
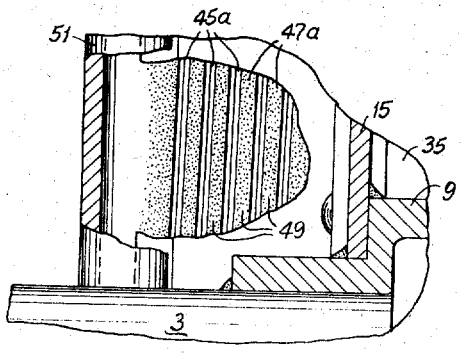
*Fig. 4 is a fragmentary view like the broken-away part of Fig. 1, illustrating an alternative referred to in the specification below.*

*Fig. 4 is illustrative of the above-mentioned spiral or helical groove form of the invention, wherein like numbers designate parts like those shown in Fig. 1. Numerals 45ᵃ and 47ᵃ designate the alternative spiral or helical forms of grooves and lands respectively.*

The purpose of the thin nonmagnetic ring 39 is to cause the flux field 53 to cross at least one nonmagnetic gap when the magnetic material 49 under driving conditions entirely fills the space 43. Thus when the coil 29 is deenergized, there is assurance that the field 53 will collapse in the absence of magnetomotive force. Without such a gap as at 39, there is a tendency for residual magnetism to maintain the magnetic circuit 53, which delays the demagnetization of material 49 when it is desired to release the clutch. With the nonmagnetic gap 39, this field immediately collapses, thus immediately demagnetizing material 49 which thereupon promptly moves by centrifugal force into the grooves 45, leaving the free space 55 outside of the cylinder 41.

It will be understood that although the shaft 1 is stated to be the driving member and shaft 3 the driven member, this relationship may be reversed. This is particularly true in a case wherein the flowable magnetic material constitutes a mixture of iron particles with grease; since with this material, when the clutch is released the member 13 (which may be the driven member) will be revolving, which at the instant of release forces the material into the grooves, as shown in Fig. 3. Thereafter it will remain there, even though the member 13 comes to rest.

A feature of the invention may be noted from the broken-away part of Fig. 1. This is that the projected areas of the grooves 45 on the cylinder 23 do not eliminate a sufficient amount of connecting magnetic material when energized (note also Fig. 2) seriously (if at all) to reduce the driving torque available in a given size of clutch. Whatever loss in area attends the use of the grooves 45 is offset by some increase in the flux concentration across the lands 47. Thus it will be seen that the criterion for effective action is not so much the particular shapes of the grooves, since they may be spiral, interrupted and even in the shape of isolated pockets or grids. The important point is the fact that they do not detract an excessively large amount of area from the remaining land material; and the fact that they are well distributed over the magnetic surface. It is the distribution and depth of the pocketing volumes throughout the magnetic surface that is important, so that the magnetic material has not far to move in moving from the pocketed position (Fig. 3) to the driving position (Fig. 2) and vice versa. The result is a simple, quickly responsive clutch of the type under consideration and one wherein all darg is instantaneously eliminated upon release.

While the description calls for a clutch it is understood that the invention can also be applied as a brake, a brake being a form of clutch where one member is anchored or restrained in its movement. Thus the term clutch used in the following claims comprehends brakes.

In view of the above, it will be seen that the several objects of the invention are achieved and other advantageous results attained.

As many changes could be made in the above constructions without departing from the scope of the invention, it is intended that all matter contanied in the above description or shown in the accompanying drawings shall be interpreted as illustrative and not in a limiting sense.

I claim:

1. A magnetic clutch comprising relatively rotary magnetic driving and driven members at least one of which is constituted by a hollow cylinder in which are formed pockets providing lands therebetween on the face of the cylinder, the other magnetic member being constituted by at least one substantially cylindric surface closely spaced with respect to certain of the lands, means for generating a flux field interlinking said members, and a flowable magnetic material located between the members in an amount adapted to form substantially solid connections between one member and said lands of the other member when the field exists, said pockets being adapted when said field disappears to accept a sufficient amount of said material under centrifugal force to ensure an air gap completely separating said members across the lands and the pockets.

2. A magnetic clutch comprising relatively rotary magnetic driving and driven members at least one of which is constituted by a hollow cylinder throughout which are formed pockets providing lands therebetween on the face of the cylinder, the other magnetic member being constituted by at least one substantially cylindric surface closely spaced with respect to certain of the lands, means for generating a flux field interlinking said members, and a flowable magneitc material located between the members in an amount adapted to form substantially solid connections between one member and said lands of the other member when the field exists, said pockets having an aggregate volume adapted when said field disappears and the member having the lands is rotating to accept a sufficient amount of said material under centrifugal force to ensure an air gap completely separating said members across the lands and the pockets.

3. A magnetic clutch comprising relatively rotary magnetic driving and driven members at least one of which is constituted by a hollow cylinder throughout which are formed substantially uniformly distributed pockets providing lands therebetween in the face of the cylinder, the other magnetic member being constituted by substantially cylindric surfaces closely spaced with respect to the lands, means for generating a flux field interlinking said members, and a flowable magnetic material located between the members in an amount adapted to form substantially solid connections between one member and the lands of the other member when the field exists, said pockets having an aggregate volume adapted when said field disappears and the member having the lands is rotating to accept a sufficient amount of said material under centrifugal force to ensure an air gap completely separating said members across the lands and the pockets.

4. A magnetic clutch comprising relatively rotary magnetic driving and driven members at least one of which is constituted by a hollow cylinder throughout which are formed substantially uniformly distributed pockets providing lands therebetween in the face of the cylinder, the other magnetic member being constituted by substantially cylindric surfaces closely spaced with respect to the lands, means for generating a flux field interlinking said members, a flowable magnetic material located between the members in an amount adapted to form substantially solid connections between one member and the lands of the other member when the field exists, said pockets having an aggregate volume adapted when said field disappears and the member having the lands is rotating to accept a sufficient amount of said material under centrifugal force to ensure an air gap completely separating said members across the lands and the pockets, said pockets being in the forms of circular grooves around the face of said hollow cylinder.

5. A magnetic clutch comprising relatively rotary magnetic driving and driven members at least one of which is constituted by a hollow cylinder throughout which are formed substantially uniformly distributed pockets providing lands therebetween in the face of the cylinder, the other magnetic member being constituted by substantially cylindric surfaces closely spaced with respect to the lands, means for generating a flux field interlinking said members, a flowable magnetic material located between the members in an amount adapted to form substantially solid connections between one member and the lands of the other member when the field exists, said pockets having an aggregate volume adapted when said field disappears and the member having the lands is rotating to accept a sufficient amount of said material under centrifugal force to ensure an air gap completely separating said members across the lands and the pockets, said pockets being in the forms of circular grooves around the face of said hollow cylinder, the widths of the grooves being of the order of a small fraction of an inch and the width of the lands about twice said fraction.

6. A magnetic clutch comprising a rotary magnetic member having a hollow cylindric surface broken by small circular grooves which are closely spaced axially to provide closely spaced circular lands, a second rotary magnetic member having a cylindric surface closely spaced with respect to said lands, a flowable magnetic material between said rotary members, and means for generating a toroidal flux field interlinking said members, the depths of said grooves and the amount of said flowable material when filling the grooves being insufficient to fill the space between the members across the lands, the widths of said lands and the spacing between said members being such that the space between the lands and the opposite member is filled by the material when attracted to the lands from the grooves by said toroidal flux field.

7. A magnetic clutch comprising a rotary magnetic member having a hollow cylindric surface broken by small circular grooves which are closely spaced axially to provide closely spaced circular lands, a second rotary magnetic member having a cylindric surface closely spaced with respect to said lands, a flowable magnetic material between said rotary members, and means for variably generating a flux field interlinking said members, the depths of said grooves and the amount of said flowable material when filling the grooves being insufficient to fill the space between the members across the lands when filled under centrifugal action when the field is broken, the widths of said lands and the spacing between said members being such that the space between the lands and the opposite member is filled by the flowable material when attracted to the lands from the grooves by said field when generated.

*8. A magnetic clutch comprising a drive member and a driven member arranged for relative rotation about a common concentric axis, adjacent spaced cylindrical clutch surfaces on said drive and driven members providing an air gap therebetween of substantially uniform cross section, a mixture of magnetic powder and a lubricant in said air gap, means for producing an electric flux in said air gap to magnetize said powder to produce friction between said adjacent surfaces, at least the outer one of said adjacent surfaces being provided with spaced grooves.*

*9. In a coupling of the character described wherein torque is transmitted through a flux field responsive fluid disposed in the space between a pair of relatively movable members which respectively constitute opposite poles of a flux field; the combination of flux concentrating means on one of said members arranged to concentrate flux along narrow circumferentially extended zones in said space, the said flux concentrating means extending spirally.*

*10. In a coupling of the character described wherein torque is transmitted through a flux field responsive fluid disposed in the space between a pair of relatively movable members which respectively constitute opposite poles of a flux field; the combination of flux concentrating means on one of said members arranged to concentrate flux along narrow circumferentially extended zones in said space, the said flux concentrating means extending circularly.*

References Cited in the file of this patent or the original patent

UNITED STATES PATENTS

| | | |
|---|---|---|
| 2,605,876 | Becker | Aug. 5, 1952 |
| 2,661,825 | Winslow | Dec. 8, 1953 |
| 2,663,809 | Winslow | Dec. 22, 1953 |

OTHER REFERENCES

Bureau of Standards Publication, Technical Report 1213, received in Division 68, March 30. 1948.